United States Patent [19]

Nagao

[11] Patent Number: 5,044,174
[45] Date of Patent: Sep. 3, 1991

[54] ABSORPTION TYPE REFRIGERATING MACHINE

[75] Inventor: Masaji Nagao, Ami, Japan
[73] Assignee: Hitachi, Ltd., Tokyo, Japan
[21] Appl. No.: 404,787
[22] Filed: Sep. 8, 1989

[30] Foreign Application Priority Data

Sep. 16, 1988 [JP] Japan .................. 63-229747

[51] Int. Cl.$^5$ .............................. F25B 15/00
[52] U.S. Cl. ................... 62/476; 62/238.3; 62/113
[58] Field of Search ............ 62/476, 238.3, 113, 62/118

[56] References Cited

U.S. PATENT DOCUMENTS

4,100,755  7/1978  Leonard ................ 62/476
4,732,008  3/1988  DeVault ................ 62/476

*Primary Examiner*—Albert J. Makay
*Assistant Examiner*—John Sollecito
*Attorney, Agent, or Firm*—Antonelli, Terry, Stout & Kraus

[57] ABSTRACT

A refrigerating machine including an evaporator section, absorber section, condenser section and a regenerator section respectively divided into two stages. The first evaporator stage and second evaporator stage are arranged so as to be enclosed by the first absorber stage and the second absorber stage, with the first absorber stage being combined with the first evaporator stage and the second absorber stage being combined with the second evaporator stage to respectively form separate units. The first low temperature regenerator stage and the second low temperature regenerator stage are arranged so as to be enclosed by the first condenser stage and the second condenser stage, with the first condenser stage being combined with the first low temperature regenerator stage, and the second condenser stage being combined with the second low temperature regenerator stage to respectively form separate units. Flow passages for chilled water and cooling water create an efficient heat transfer in the divided evaporator, absorber and condenser sections, with a flow of cooling water flowing into the absorption type refrigerating machine being reduced and overall efficiency of the refrigerating machine being increased.

19 Claims, 3 Drawing Sheets

ABSORPTION TYPE REFRIGERATING MACHINE

BACKGROUND OF THE INVENTION

The present invention relates to an absorption type refrigerating machine and, more particularly, to large scale multi-stage absorption type refrigerating machine used in area heating and cooling systems for attaining a high efficiency.

A conventional heat pump absorption heating and cooling apparatus is proposed in, for example, Japanese Patent Laid-Open No. 49,465/1984, in which chilled water flowing into an evaporator works as a low temperature heat source, and cooling water flowing into an absorber and condenser works as hot water, and heat is removed to the exterior of the apparatus.

In the above conventional heat pump type absorption heating and cooling apparatus, it has been proposed to respectively divide the evaporator, the absorber, a regenerator, and the condenser into at least two parts through a partitioning wall, with each divided component being combined and constructed for at least two independent absorption solution cycles, in which the chilled water flows into a first evaporator and a second evaporator from a side having a high temperature level, the cooling water flows into a first absorber and a second absorber from a side having a low temperature level, and, after that, the cooling water, having been heated to the highest temperature, flows out from the first condenser through a second condenser.

In general, with a large scale absorption type refrigerating machine, an amount of the chilled water and an amount of the cooling water inevitably increases, and, accordingly, any necessary associated equipment such as a conveying pump, piping, a cooling tower, etc. naturally becomes relatively large sized.

Additionally, in many cases the large-scale absorption type refrigerating machine is used in an area heating and cooling system, and is subject to restrictions imposed due to an installation space, building size, the land for accommodating the refrigerating machine, etc.

With respect to the chilled water, for example, though the chilled water temperature in the conventional general absorption type refrigerating machine is 12° C. at the inlet and $-7°$ C. at the outlet, consideration must be given to the fact that the quantity of chilled water is lowered by 70% thereby resulting in a difference in temperature at the inlet or outlet of 1.4 times such as, for example, 13° C. at the inlet and $-6°$ C. at the outlet.

Moreover, with respect to the cooling water, for example, though the cooling water temperature in the conventional general absorption type refrigerating machine is 32° C. at the inlet and $-37.4°$ C. at the outlet, consideration must be given to the fact that the volume of cooling water is lowered 90% by providing a difference in temperature of 1.1 times such as 32° C. at the inlet and $-38°$ C. at the outlet.

The reduction in the quantity of water lowers an electric power consumption and economizes energy, however, a problem arises in that the efficiency of the refrigerating cycle is lowered by virtue of the above noted increase in the temperature differences.

Even in the technique described in the above-identified Japanese Patent Laid-Open No. 49,465/1984, the efficiency of the refrigerating cycle is unsatisfactory with a large scale refrigerating machine particularly for use in area heating and cooling systems.

SUMMARY OF THE INVENTION

The aim underlying the present invention essentially resides in providing an absorption type refrigerating machine wherein an amount of cooling water can be reduced by setting a temperature differential, that is, a difference in temperature between an inlet temperature and an outlet temperature, which is capable of coping with a scaling up of the refrigerating machine.

In accordance with the present invention, an absorption type refrigerating machine is provided wherein a cycle efficiency can be improved by minimizing an amount of radiant heat from a main body shell accommodating an evaporator, an absorber, a condenser, and a regenerator, whereby the total cost can be reduced by dispensing with the need for insulation of the main body shell.

The absorption type refrigerating machine according to the present invention includes an evaporator section, an absorber section, a condenser section, a regenerator section, a solution heat exchanger, a solution pump, a refrigerant pump, and a piping system, with chilled water being fed into the evaporator, and cooling water being fed into the absorber and the condenser. The evaporator section, absorber section, condenser section, and regenerator section are respectively divided into N units, with the N units of the divided evaporators being arranged so as to be enclosed by the N units of the divided absorbers. A first unit of the divided absorbers and first unit of the divided evaporator are combined, and a second unit of the divided absorbers and second unit of the divided evaporator are also combined, and the N units of the divided absorbers and N units of the divided evaporators disposed in a successive order. The N units of the divided regenerator are arranged so as to be enclosed by the N units of the divided condensers, with a first unit of the divided condensers and a first unit of the divided regenerators being combined, and a second unit of the divided condensers and second unit of the divided generators also being combined, and the N units of the divided condensers and N units of the divided regenerators are disposed in successive order.

In accordance with the present invention, a flow passage is provided through which the chilled water is successively fed into the end units of the evaporator and the $(N-1)$ units of the evaporator, from a high temperature level side, and the cooling water is fed into N units of the absorber and N units of the condenser, from a low temperature level side, and, after the cooling water has passed through the N units of the absorber and the N units of the condenser, the cooling water is fed into the $(N-1)$ unit of the absorber and $(N-1)$ unit of the condenser.

According to the present invention, the evaporator, the absorber, the condenser, and the regenerator are each divided, the regenerator or high temperature portion is enclosed by the condenser at atmospheric temperature, and the evaporator or low temperature portion is enclosed by the absorber whereby hardly any heat dispersion is caused and both an improved total efficiency and reduced costs can be realized.

Next, the chilled water is successively fed from the N units of the evaporator to the $(N-1)$ unit of the evaporator through N stages or paths, from a high temperature level side. Besides, the cooling water is successively fed into the absorber and the condenser from a low temperature level side and the cooling water is respectively fed into the absorber and the condenser at N stages or paths.

The N stage of the absorber at the (N−1) stage or path is combined with the N stage of the evaporator, and the (N−1) stage of the absorber at the N stage or path is combined with the (N−1) stage of the evaporator, respectively, and further the N units of the condenser at the (N−1) stage or path is combined with the N unit of the low temperature regenerator, and the (N−1) unit of the condenser at the N stage or path is combined with the (N−1) unit of the low temperature regenerator respectively. Accordingly, the counter flow in the cycle can be perfectly realized, and an improved efficiency can be obtained.

DETAILED DESCRIPTION

Figure 1:
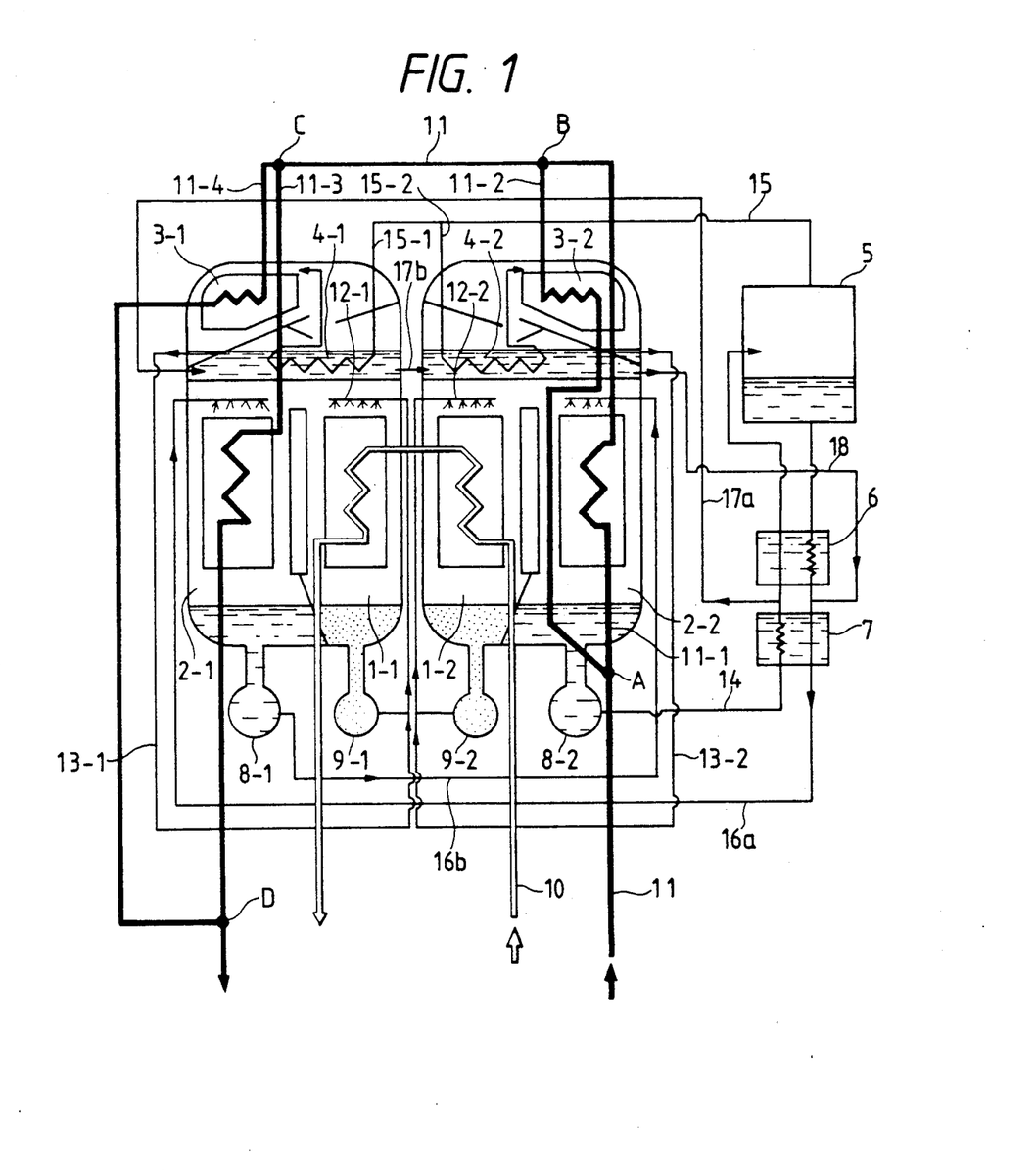
FIG. 1 is a schematic cycle system of a double effect absorption type refrigerating machine according to one embodiment of the present invention.

Referring now to the drawings wherein like reference numerals are used throughout the various views to designate like parts and, more particularly, to FIG. 1, according to this figure, a double effect absorption type refrigerating machine according to the invention includes an evaporator section divided into a first evaporator stage 1-1 and a second evaporator stage 1-2; an absorber section including a first absorber stage 2-1 and a second absorber stage 2-2; a condenser section including a first condenser stage 3-1 and a second condenser stage 3-2; a regenerator section including a first low temperature regenerator stage 4-1 and a second low temperature regenerator stage 4-2; a high temperature regenerator 5; a high temperature heat exchanger 6; a low temperature heat exchanger 7; a first solution pump 8-1; a second solution pump 8-2; a first refrigerant pump 9-1; and a second refrigerant pump 9-2.

The first absorber stage 2-1 and the first evaporator stage 1-1 are combined into a first unit accommodated in a first shell 20, with the second absorber stage 2-2 and the second evaporator stage 1-2 being combined into a second unit accommodated in a second shell 21. The first and second units are arranged such that the first and second evaporator stages 1-1, 1-2 are sandwiched or interposed between the first and second absorber stages 2-1, 2-2.

The first condenser stage 3-1 and the first low temperature regenerator stage 4-1 are accommodated in an upper portion of the first shell 20, with the second condenser stage 3-2 and second low temperature generator stage, 4-2 being accommodated in an upper portion of the second shell 21.

A chilled water piping 10 defines a flow passage for chilled water from a high temperature level side sequentially to the second evaporator stage 1-2 and the first evaporator stage 1-1.

A cooling water piping 11 defines a flow passage for the cooling water to the absorber and the condenser, with the cooling water piping 11 branching at point A into a first cooling water pipe 11-1 and a second cooling water piping 11-2. From a low temperature level side, the cooling water flows into the second absorber stage 2-2 by the cooling water piping 11-1 and the cooling water flows into the second condenser stage 3-2 by the cooling water piping 11-2. After that the cooling water flows together at point B and is again branched at point C. The cooling water flows into the first absorber stage 2-1 by a cooling water piping 11-3 and the cooling water flows into the first condenser stage 3-1 by a cooling water piping 11-4, after that the cooling water flows together at point D and flows out of the refrigerating machine.

A first refrigerant spray piping 12-1 and a second refrigerant spray pipe 12-2 are provided, with a first liquid refrigerant piping 13-1 being led from the first condenser stage 3-1 and flowing into the first refrigerant spray piping 12-1, with a second liquid refrigerant piping 13-2 being led from the second condenser stage 3-2 and flowing into the second refrigerant spray pipe 12-2. A weak solution piping 14 connects the second absorber stage 2-2 and the high temperature regenerator 5, with a first refrigerant vapor piping 15-1 connecting the high temperature regenerator 5 to the first condenser stage 3-1 through the first low temperature regenerator stage 4-1. A second refrigerant vapor piping 15-2 connects the high temperature regenerator 5 to the second condenser stage 3-2 through the second low temperature regenerator stage 4-2, and a strong solution piping 16b connects the high temperature regenerator 5 and the first absorber stage 2-1. A strong solution piping 16a connects the first absorber stage 2-1 with the high temperature regenerator 5. A weak solution piping 17a is connected solution with the first low temperature regenerator stage 4.1. An intermediate weak solution piping 17b connects the first low temperature regenerator stage 4-1 and the second low temperature regenerator stage 4-2. A strong solution piping 18 connects the second low temperature regenerator stage 4-2 with the strong solution piping 16a. In operation, the chilled water from the chilled water piping 10 to the evaporator is introduced to the second evaporator stage 1-2 with the inlet temperature 13° C., and, at the outside of the piping 10, the refrigerant is sprayed from the nozzle of the second refrigerant spray piping 12-2 by the second refrigerant pump 9-2 so as to remove the heat from the chilled water through the evaporation latent heat.

The chilled water obtains an outlet temperature of 9.0° C. in the second evaporator stage 1-2 leads into the first evaporator stage 1-1, and, exteriorly of the piping 10, the refrigerant is sprayed from the nozzle of the first refrigerant spray piping 12-1 by the first refrigerant pump 9-1, the refrigerant is then evaporated, and the chilled water flows out of the refrigerating machine with an outlet temperature of 6° C.

In general, a value in a vapor pressure of the lithium bromide aqueous solution can be remarkably lowered as compared with water at the same temperature conditions, and the aqueous solution can absorb the generated vapor with the comparatively low temperature. Namely, in the first absorber stage 2-1 and the second absorber stage 2-2, the refrigerant vapor evaporated from the first evaporator stage 1-1 and the second evaporator stage 1-2 is absorbed in the lithium bromide aqueous solution, i.e., absorption liquid, which is sprayed exteriorly of the cooling water piping 11, and the absorption heat generated at this time is cooled through the cooling water passing interiorly of the piping 11.

The cooling water fed from the cooling water piping 11 to the second absorber stage 2-2 through the cooling water piping 11-1 obtains an inlet temperature of 32° C. and an outlet temperature of 37.2° C., respectively. The cooling water through the second absorber stage 2-2 obtains an inlet temperature of 37.2° by the cooling water piping 11-3 and is led into the first absorber stage 2-1 and obtains an outlet temperature of 41° C.

The weak solution is absorbed in the refrigerant in the first absorber stage 2-1 and the second absorber stage 2-2 and is lowered in concentration such that the weak solution becomes even weaker. A part of the weak solution is supplied by the second solution pump 8-2 to the high temperature regenerator 5 through the weak solution piping 14, and another part of the weak solution supplied by the second solution pump 8.2, is delivered into the first low temperature regenerator stage 4-1 and the second low temperature regenerator stage 4-2 by the diluted solution piping 17a and the intermediate weak solution piping 17b.

The weak solution delivered or supplied to the high temperature regenerator 5 is heated by the heat source, evaporates and separates the high temperature refrigerant vapor from the weak solution which is then condensed. The condensed weak solution is returned to the first absorber stage 2-1 and the second absorber stage 2-2 by the strong solution piping 16a and the intermediate strong solution piping 16b.

The weak solution delivered or supplied to the first low temperature regenerator stage 4-1 and the second low temperature regenerator stage 4-2 is heated and condensed by the high temperature refrigerant vapor generated in the high temperature regenerator 5 and passing through the first refrigerant vapor piping 15-1 and the second refrigerant vapor piping 15-2. The condensed solution flows through the strong solution piping 18 to the low temperature heat exchanger 7 and returns to the first absorber stage 2-1.

At this time the weak solution having a low temperature and going from the absorber to the high temperature regenerator, is heated by the strong solution having a high temperature and, returned from the high temperature regenerator and the low temperature regenerator to the absorber. So as to heighten the heat exchanger efficiency, the high temperature heat exchanger 6 and the low temperature heat exchanger 7 shown in FIG. 1 act as the solution heat exchanger.

The high temperature refrigerant vapor flowing into the first refrigerant vapor piping 15-1 and the second refrigerant vapor piping 15-2 discharges a part of the heat from the low temperature regenerator stage 4-1 and the second low temperature regenerator stage 4-2, with the refrigerant vapor entering the first condenser stage 3-1 and the second condenser stage 3-2 where the high temperature refrigerant vapor is cooled by the cooling water flowing in the cooling water piping 11-4 and the cooling water piping 11.2, condensed, liquified, and respectively returned to the first evaporator stage 1-1 and the second evaporator stage 1-2 by the first liquid refrigerant piping 13-1 and the second liquid refrigerant piping 13-2.

As shown in FIG. 1, the cooling water flowing into the cooling water piping 11 passes the second condenser stage 3-2 with an inlet temperature of 32° C. and obtains an outlet temperature of 37.2° C. This cooling water passes the first condenser stage 3-1 with an inlet temperature of 37.2° C. and flows out of the refrigerating machine with an outlet temperature of 41° C.

Since the chilled water piping 10 and the cooling water piping 11 form a counterflow system, the combined effects of the counterflow system, the refrigerant cycle and the solution cycle improve the overall refrigerating efficiency.

For example, with a high concentration solution of 62.5% from the high temperature regenerator 5, the second low temperature regenerator stage 4-2 provides chilled water having a temperature of 6° C. when the first absorber stage 2-1 has a 61% solution and temperature of 45° C. and a refrigerant at 3.5° C. and 6 mmHg in combination with a cooling water having a high outlet temperature of 41° C. in the first absorber stage 2-1.

With an intermediate concentration solution of 61% at 45° C. flowing out of the first absorber stage 2-1 and a cooling water having a low outlet temperature of 37.2° C., a chilled water having a temperature of 9° C. is obtained when the second absorber stage 2-2 has a solution of 58% and 42° C. and refrigerant of 5.5° C. at 7 mmHg in the second evaporator stage 1-2.

In other words, as compared with an arrangement wherein the first evaporator, first absorber, second evaporator, and second absorber are not divided, the difference in mean temperature between the cooling water and the solution in the absorber can be as large as 4° C. Accordingly, even when the outlet temperature of the cooling water which is ordinarily 37.4° C. is raised to 41° C., it is unnecessary to provide any additional heat exchanger tubes.

Additionally, by virtue of the combination of the low temperature regenerator and the condenser, the low concentration solution of 58% and the cooling water having a high outlet temperature of 41° C. are received in the first low temperature regenerator stage 4-1 and the first condenser stage 3-1, and the intermediate concentration solution of 59.5% and the cooling water having a low outlet temperature of 37.2° C. are received in the second low temperature regenerator stage 4-2 and the second condenser stage 3-2.

As compared with an arrangement wherein the units are not divided, a difference in a mean temperature can be as large as about 4° C. Accordingly, it is unnecessary to provide any additional heat exchanger tubes and the pressure in the high temperature regenerator 5 can be fully maintained at a vacuum side of 550 mmHg against atmospheric pressure.

While the above described embodiment related to dividing the sections into two parts, as can readily be appreciated, it is possible to divide the respective sections into three or more units, and, by the combination of the divided evaporators, absorbers, condensers, and regenerators, it is possible to realize an excellent performance.

Figure 2:
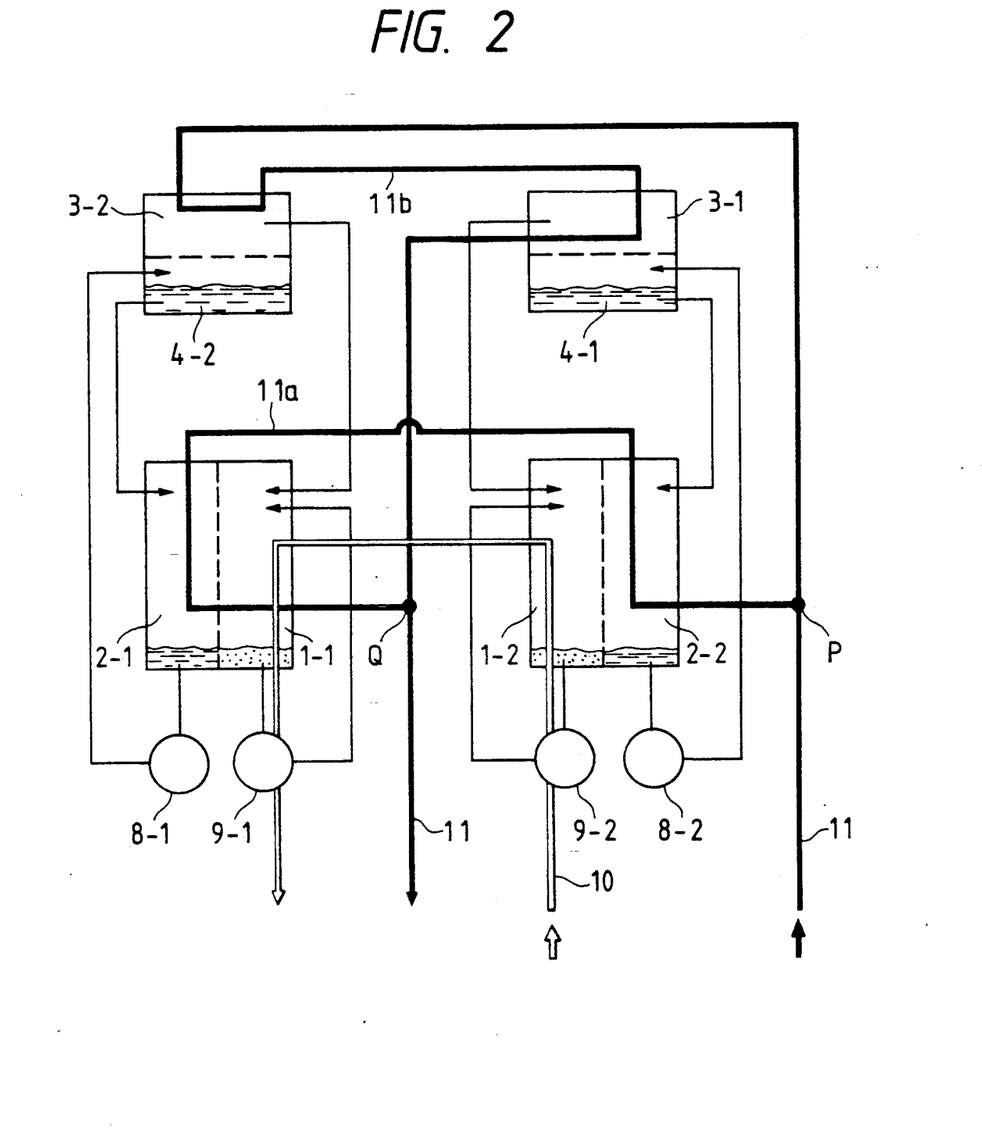
FIG. 2 is a schematic cycle system of an absorption type refrigerating machine portion according to another embodiment of the present invention.

In FIG. 2, the flow of the chilled water is the same as the embodiment shown in FIG. 1. The cooling water piping 11 flows together at a point Q and passes from a low temperature level side through the second absorber stage 2-2 and the first absorber stage 2-1, in turn, by the cooling water piping 11a which is branched at a point P of the cooling water piping 11.

Additionally, by the cooling water piping 11b branched at the point P, the cooling water piping system flows together at the point Q after passing from a low temperature level side through the second condenser stage 3-2 and the first condenser stage 3-1 and then flows out of the refrigerating machine.

By virtue of the construction of the flow passages for the chilled water and cooling water in FIG. 2, similar effects as outlined hereinabove in connection with the embodiment of FIG. 1 can be expected. Moreover, while the embodiment of FIG. 2 provides a chilled water system and cooling water piping system in a double effect absorption type refrigerating machine as is the case of the embodiment of FIG. 1, the embodiment of FIG. 2 is readily adaptable to a single effect absorption type refrigerating machine.

Figure 3:
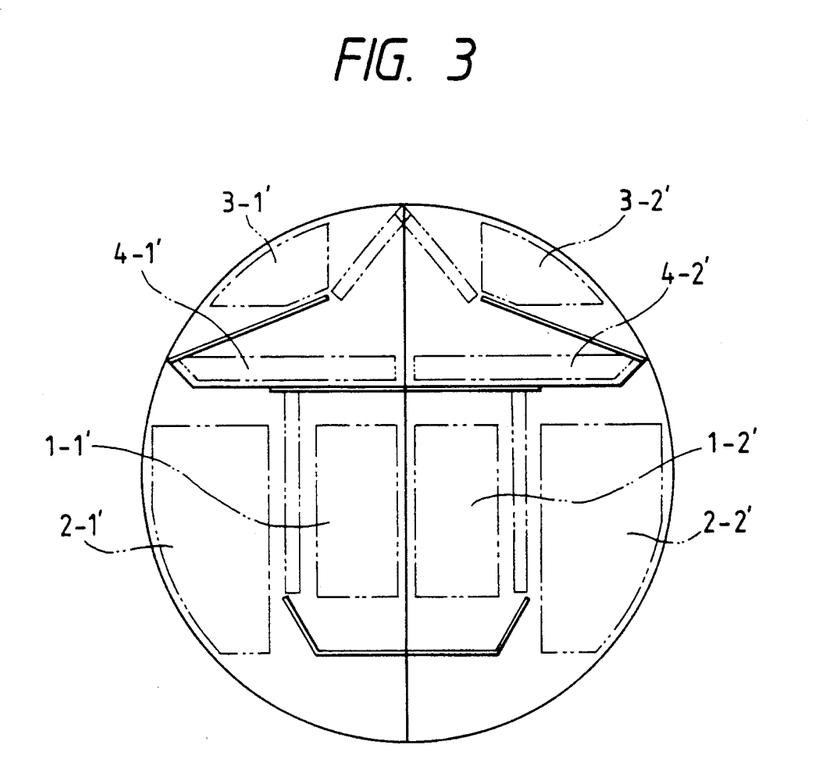
FIG. 3 is a schematic view of a double or a single effect absorption type refrigerating machine according to a further embodiment of the present invention.

In FIG. 3, a double or single effect absorption type refrigerating machine includes a first absorber stage 2-1' and a second absorber stage 2-2' sandwiching or having interposed therebetween a first evaporator stage 1-1' and a second evaporator stage 1-2' which are divided into two parts by a partitioning wall, with the first and second absorber stages 2-1', 2-2' being arranged so as to enclose the first and second evaporator stages 1-1', 1-2'. The first absorber stage 2-1' and the first evaporator stage 1-1' are combined into a first unit, and the second absorber stage 2-2' and the second evaporator stage 1-1' are combined into a second unit.

A first condenser stage 3-1' and a second condenser stage 3-2' sandwiches or has interposed therebetween a first regenerator stage 4-1' and a second regenerator stage 4-2' divided into two parts by a partitioning wall. The first and second condenser stages 3-1', 3-2' are arranged so as to enclose the first and second regenerator stages 4-1', 4-2'.

The first condenser stage 3-1' and the first regenerator stage 4-1' are combined into a first unit, and the second condenser stage 3-2' and the second regenerator stage 4-2' are combined into a second unit.

In FIG. 3, the regenerator or high temperature portion is enclosed by the condenser at nearly atmospheric pressure and the evaporator or low temperature portion is enclosed by the absorber so that there is very little heat dispersion whereby the total efficiency of the refrigerating machine is improved and the total cost is reduced by not requiring insulation for the shell accommodating the units.

In FIG. 3, the flow passages of the chilled water and the cooling water are omitted for the sake of clarity; however, the constructions of the flow passages are similar to the constructions described hereinabove in connection with FIG. 2, and, accordingly, the embodiment of FIG. 3 can achieve similar effects shown in the above described embodiment of FIG. 2.

I claim:

1. An absorption type refrigerating machine comprising an evaporator means, absorber means, condenser means, a regenerator means, solution heat exchanger means, solution pump means, refrigeration pump means, and piping means for supplying chilled water into said evaporator means and cooling water into said absorber means and said condenser means, wherein each of said evaporator means, absorber means, condenser means, and regenerator means is divided into N stages, each of said Nth stages of said evaporator means are arranged so as to share a common enclosure with corresponding Nth stages of said absorber means, a first stage of said divided absorber means and a first stage of said divided evaporator means are combined so as to form a first unit, a second stage of said absorber means and a second stage of said evaporator means are combined to form a second unit, said first and second units are arranged in succession, and each of said Nth stages of said regenerator means are arranged so as to be enclosed by said N stages of said evaporator means, a first stage of said condenser means and a first stage of said regenerator means are combined to form a third unit, a second stage of said condenser means and a second stage of said regenerator means are combined to form a fourth unit, and wherein said third and fourth units are arranged in succession.

2. An absorption type refrigerating machine according to claim 1, wherein said regenerator means and said condenser means are arranged at an upper portion of said evaporator means and said absorber means.

3. An absorption type refrigerating machine comprising an evaporator means, an absorber means, a condenser means, a regenerator means, a solution heat exchanger means, a solution pump means, a refrigerant pump means, and piping means for leading chilled water into said evaporator means and cooling water into said absorber means and said condenser means, each of said evaporator means, said absorber means, said condenser means and regenerator means is respectively divided into N sections, each of said Nth sections of said evaporator means share a common enclosure with corresponding Nth sections of said absorber means, a first section of said N sections of absorber means and a first section of said N sections of evaporator means are combined to form a first unit, a second section of said N sections of absorber means and a second section of said N sections of evaporator means are combined to form a second unit, and said first unit and said second unit are arranged in successive order, each of said Nth sections of said regenerator means share a common enclosure with corresponding Nth sections of said evaporator means, a first section of said end sections of condenser means and a first section of said N sections of regenerator means are combined to form a third unit, a second section of said N sections of condenser means and a second section of said N sections of regenerator means are combined to form a fourth unit, and said third unit and said fourth unit are arranged in succession, said N sections of said regenerator means and said N sections of said condenser means are arranged at an upper portion of respective N sections of said evaporator means and said absorber means, and wherein a common shell means is provided for accommodating each of said evaporator means, said absorber means, said condenser means, and said regenerator means.

4. An absorption type refrigerating machine comprising an evaporator means, an absorber means, a condenser means, a regenerator means, a solution heat exchanger means, a solution pump means, a refrigerant pump means, and piping means for leading chilled water into said evaporator means and cooling water into said absorber means and said condenser means, each of said evaporator means, said absorber means, said condenser means and said regenerator means is respectively divided into N sections, each of said Nth sections of said evaporator means share a common enclosure with corresponding Nth sections of said absorber means, a first section of said N sections of absorber means and a first section of said N sections of evaporator means are combined to form a first unit, a second section of each of said Nth sections of absorber means and a second section of said N sections of said evaporator means are combined to form a second unit, and said first unit and said second unit are arranged in successive order, said pipe means including a first flow passage through which the chilled water is successively led from said Nth section of said evaporator means to the (N−1) section of said evaporator means from a high level temperature side of said evaporator means, and a second flow passage through which the cooling water is successively led into said Nth section of said absorber means and said Nth section of said condenser means from a low temperature level side, after the cooling water has passed said Nth section said absorber means and said Nth section of said condenser means, and the cooling water is led into the (N−1) section of said absorber means and the (N−1) section of said condenser means.

5. An absorption type refrigerating machine according to claim 4, wherein N equal two.

6. An absorption type refrigerating machine according to claim 5, wherein said N sections of said regenerator means and said N sections of said condenser means are respectively arranged at an upper portion of said N sections of said evaporator means and said N sections of said absorber means.

7. An absorption type refrigerating machine comprising an evaporator means, an absorber means, a condenser means, a regenerator means, a solution heat exchanger means, a solution pump means, a refrigerant pump means and piping means for leading chilled water into said evaporator means and cooling water into said absorber means and said condenser means, each of said evaporator means, said absorber means, said condenser means and said regenerator means is respectively divided into N sections, each of said Nth sections of said evaporator means share a common enclosure with corresponding Nth sections of said absorber means, a first section of said N sections of absorber means and a first section of said N sections of evaporator means are combined to form a first unit, a second section of said N section of absorber means and a second section of said N sections of said evaporator means are combined to form a second unit, and said first unit and said second unit are arranged in successive order, said piping means includes a first flow passage through which the chilled water is successively led from said Nth section of said evaporator means to the (N−1) section of said evaporator means from a high temperature level side of said evaporator means, and a second flow passage through which the cooling water is successively led into said Nth section of said absorber means and said Nth section of said condenser means from a low temperature level side, after the cooling water has passed said Nth section of said absorber means and said Nth section of said condenser means, and the cooling water is led into the (N−1) section of said absorber means and the (N−1) section of said condenser means, said N sections of regenerator means and said N sections of condenser means are respectively arranged at an upper portion of said N sections of said evaporator means and said N sections of said absorber means, and wherein a common shell means is provided for accommodating each of said evaporator means, said absorber means, said condenser means and said regenerator means.

8. An absorption type refrigerating machine comprising an evaporator means, an absorber means, a condenser means, a regenerator means, a solution heat exchanger means, a solution pump means, a refrigerant pump means and piping means for leading chilled water into said evaporator means and cooling water into said absorber means and said condenser means, each of said evaporator means, said absorber means, said condenser means and said regenerator means are respectively divided into N sections, each of said Nth sections of said evaporator means share a common enclosure with corresponding Nth sections of said absorber means, a first section of said N sections of absorber means and a first section of said N sections of evaporator means are combined to form a first unit, a second section of said N sections of absorber means and a second section of said N sections of said evaporator means are combined to form a second unit, and said first unit and said second unit are arranged in successive order, said piping means includes a first flow passage through which the chilled water is successively led from said Nth section of said evaporator means to the (N−1) section of said evaporator means from a high temperature level side of said evaporator means, and a second flow passage through which the cooling water is successively led into said Nth section of said absorber means and said Nth section of said condenser means from a low temperature level side, after the cooling water has passed said Nth section of said absorber means and said Nth section of said condenser means, the cooling water then flows together and is subsequently branched and led into the (N−1) section of said absorber means and the (N−1) section of said condenser means, and cooling water is subsequently recombined and flows out of the refrigerating machine.

9. An absorption type refrigerating machine according to claim 8, wherein N equal two.

10. An absorption type refrigerating machine according to claim 9, wherein said N sections of said regenerator means and said N sections of said condenser means are respectively arranged at an upper portion of said N sections of said evaporator means and said N sections of said absorber means.

11. An absorption type refrigerating machine comprising an evaporator means, an absorber means, a condenser means, a regenerator means, a solution heat exchanger means, a solution pump means, a refrigerant pump means and piping means for leading chilled water into said evaporator means and cooling water into said absorber means and said condenser means, each of said evaporator means, said absorber means, said condenser means and said regenerator means is respectively divided into N sections, each of said N sections of said evaporator means share a common enclosure with corresponding Nth sections of said absorber means, a first section of said N sections of absorber means and a first section of said N sections of evaporator means are combined to form a first unit, a second section of said N section of absorber means and a second section of said N sections of said evaporator means are combined to form a second unit, and said first unit and said second unit are arranged in successive order, said piping means includes a first flow passage through which the chilled water is successively led from said Nth section of said evaporator means to the (N−1) section of said evaporator means from a high temperature level side of said evaporator means, and a second flow passage through which the cooling water is successively led into said Nth section of said absorber means and said Nth section of said condenser means from a low level temperature side, after the cooling water has passed said Nth section of said absorber means and said Nth section of said condenser means, the cooling water flows together and is subsequently branched with the cooling water being led into the (N−1) section of said absorber means and the (N−1) section of said condenser means, and subsequently recombined and flows out of the refrigerating machine, said divided absorber, said N sections of regenerator means and said N sections of condenser means are respectively arranged at an upper portion of said N sections of said evaporator means and said N sections of said absorber means, and wherein a common shell means is provided for accommodating each of said evaporator means, said absorber means, said condenser means, and said regenerator means.

12. An absorption type refrigerating machine comprising an evaporator means, an absorber means, a condenser means, a regenerator means, a solution heat exchanger means, a solution pump means, a refrigerant pump means and piping means for leading chilled water into said evaporator means and cooling water into said absorber means and said condenser means, each of said evaporator means, said absorber means, said condenser means and said regenerator means is respectively divided into N sections, each of said Nth sections of said evaporator means share a common enclosure with corresponding Nth sections of said absorber means, a first section of said N sections of absorber means and a first section of said N sections of evaporator means are combined to form a first unit, a second section of said N sections of absorber means and a second section of said N sections of said evaporator means are combined to form a second unit, and said first unit and said second unit are arranged in successive order, each of said Nth sections of said regenerator means share a common enclosure with corresponding Nth sections of said evaporator means, a first section of said N sections of condenser means and a first section of said N sections of regenerator means are combined to form a third unit, a second section of said N sections of condenser means and a second section of said N sections of regenerator means are combined to form a fourth unit, and said third unit and said fourth unit are arranged in succession, said piping means includes a first flow passage through which the chilled water is successively led from said Nth section of said evaporator means to the (N−1) section of said evaporator means from a high level temperature side of said evaporator means, a second flow passage through which the cooling water is successively led from said Nth section of said absorber means to the (N−1) section of said absorber means from a low temperature level side, and a third flow passage through which the cooling water is successively led from said Nth section of said condenser means to the (N−1) section of said condenser means from the low temperature level side.

13. An absorption type refrigerating machine according to claim 12, wherein N equal two.

14. An absorption type refrigerating machine according to claim 13, wherein said N sections of said regenerator means and said N sections of said condenser means are respectively arranged at an upper portion of said N sections of said evaporator means and said N sections of said absorber means.

15. An absorption type refrigerating machine comprising an evaporator means, an absorber means, a condenser means, a regenerator means, a solution heat exchanger means, a solution pump means, a refrigerant pump means and piping means for leading chilled water into said evaporator means and cooling water into said absorber means and said condenser means, each of said evaporator means, said absorber means, said condenser means and said regenerator means is respectively divided into N sections, each of said Nth sections of said evaporator means share a common enclosure with corresponding Nth sections of said absorber means, a first section of said N sections of absorber means and a first section of said N sections of evaporator means are combined to form a first unit, a second section of said N sections of absorber means and a second section of said N sections of said evaporator means are combined to form a second unit, and said first unit and said second unit are arranged in successive order, of said Nth sections of said regenerator means share a common enclosure with corresponding Nth sections of said evaporator means, a first section of said N sections of condenser means and a first section of said N sections of regenerator means are combined to form a third unit, a second section of said N sections of condenser means and a second section of said N sections of regenerator means are combined to form a fourth unit, and said third unit and said fourth unit are arranged in succession, said piping means includes a first flow passage through which the chilled water is successively led from said Nth section of said evaporator means to the (N−1) section of said evaporator means from a high level temperature side of said evaporator means, a second flow passage through which the cooling water is successively led from said Nth section of said absorber means to the (N−1) section of said absorber means from a low temperature level side, and a third flow passage through which the cooling water is successively led from said Nth section of said condenser means to the (N−1) section of said condenser means from the low temperature level side, said divided evaporator and said divided absorber, said N sections of regenerator means and said N sections of condenser means are respectively arranged at an upper portion of said N sections of said evaporator means and absorber means, and wherein a common shell means is provided for accommodating each of said evaporator means, said absorber means, said condenser means, and said evaporator means.

16. An absorption type refrigerating machine comprising an evaporator means, an absorber means, a condenser means, a regenerator means, a solution heat exchanger means, a solution pump means, a refrigerant pump means and piping means for leading chilled water into said evaporator means and cooling water into said absorber means and said condenser means, each of said evaporator means, said absorber means, said condenser means and said regenerator means are respectively divided into N sections, each of said Nth sections of said evaporator means share a common enclosure with corresponding Nth sections of said absorber means, a first section of said N sections of absorber means and a first section of said N sections of evaporator means are combined to form a first unit, a second section of said N sections of absorber means and a second section of said N sections of said evaporator means are combined to form a second unit, and said first unit and said second unit are arranged in successive order, each of said Nth sections of said regenerator means share a common enclosure with corresponding Nth sections of said evaporator means, a first section of said N sections of condenser means and a first section of said N sections of regenerator means are combined to form a third unit, a second section of said N sections of condenser means and a second section of said N sections of regenerator means are combined to form a fourth unit, and said third unit and said fourth unit are arranged in succession, said piping means includes a first flow passage through which the chilled water is successively led from said Nth section of said evaporator means to the (N−1)

section of said evaporator means from a high temperature level side of said evaporator means, and a second flow passage through which the cooling water is branched, with a first portion of the cooling water being successively led from said Nth section of said absorber means to said Nth section of said condenser from a low temperature level side, and a second portion being successively led from said Nth section of said condenser means to the (N−1) section of said condenser means and recombining with the first portion of cooling water to flow out of the refrigerating machine.

17. An absorption type refrigerating machine according to claim 16, wherein N equal two.

18. An absorption type refrigerating machine according to claim 17, wherein said N sections of said regenerator means and said N sections of said condenser means are respectively arranged at an upper portion of said N sections of said evaporator means and said N sections of said absorber means.

19. An absorption type refrigerating machine comprising an evaporator means, an absorber means, a condenser means, a regenerator means, a solution heat exchanger means, a solution pump means, a refrigerant pump means and piping means for leading chilled water into said evaporator means and cooling water into said absorber means and said condenser means, each of said evaporator means, said absorber means, said condenser means and said regenerator means is respectively divided into N sections, each of said Nth sections of said evaporator means share a common enclosure with corresponding Nth sections of said absorber means, a first section of said N sections of absorber means and a first section of said N sections of evaporator means are combined to form a first unit, a second section of said N sections of absorber means and a second section of said N sections of said evaporator means are combined to form a second unit, and said first unit and said second unit are arranged in successive order, each of said Nth sections of said regenerator means share a common enclosure with corresponding Nth sections of said evaporator means, a first section of said N sections of condenser means and a first section of said N sections of regenerator means are combined to form a third unit, a second section of said N sections of condenser means and a second section of said N sections of regenerator means are combined to form a fourth unit, and said third unit and said fourth unit are arranged in succession, said piping means includes a first flow passage through which the chilled water is successively led from said Nth section of said evaporator means to the (N−1) section of said evaporator means from a high temperature level side of said evaporator means, and a second flow passage through which the cooling water is branched, with a first portion of the cooling water being successively led from said Nth section of said absorber means to said Nth section of said condenser from a low temperature level side, and a second portion being successively led from said Nth section of said condenser means to the (N−1) section of said condenser means and recombining with the first portion of cooling water to flow out of the refrigerating machine, said N sections of regenerator means and said N sections of condenser means are respectively arranged at an upper portion of said N sections of evaporator means and absorber means, and wherein a common shell means is provided for accommodating each of said evaporator means, said absorber means, said condenser means and said regenerator means.

* * * * *